(12) United States Patent
Jarmulak et al.

(10) Patent No.: US 8,086,444 B2
(45) Date of Patent: Dec. 27, 2011

(54) METHOD AND SYSTEM FOR GRAMMAR RELAXATION

(75) Inventors: Jacek Jarmulak, Grapevine, TX (US); Yevgeniy Lyudovyk, Morganville, NJ (US)

(73) Assignee: Resolvity, Inc., Irving, TX (US)

( * ) Notice: Subject to any disclaimer, the term of this patent is extended or adjusted under 35 U.S.C. 154(b) by 279 days.

(21) Appl. No.: 12/387,412

(22) Filed: May 1, 2009

(65) Prior Publication Data

US 2009/0292530 A1 Nov. 26, 2009

Related U.S. Application Data

(60) Provisional application No. 61/054,975, filed on May 21, 2008.

(51) Int. Cl.
*G10L 17/21* (2006.01)
(52) U.S. Cl. ............................. 704/10; 704/257; 704/9
(58) Field of Classification Search ................ 704/1–10, 704/231, 235, 244, 255, 257, 243, 270
See application file for complete search history.

(56) References Cited

U.S. PATENT DOCUMENTS

| | | | |
|---|---|---|---|
| 5,995,918 A | 11/1999 | Kendall et al. | |
| 7,103,542 B2 * | 9/2006 | Doyle | 704/231 |
| 7,257,529 B2 | 8/2007 | Bennett | |
| 7,315,818 B2 * | 1/2008 | Stevens et al. | 704/235 |
| 2006/0259294 A1 | 11/2006 | Tashereau | |

* cited by examiner

*Primary Examiner* — Huyen X. Vo

(57) ABSTRACT

The method and system for modifications of grammars presented in this invention applies to automatic speech recognition systems which take a spoken utterance as input and use a grammar to assign word sequence(s) and, possibly, one or more semantic interpretations to that utterance. One type of modification may take a form of reducing the importance of select grammar components based on the analysis of the occurrence of these components in the original grammar. Another type of modification may take form of adding new grammar components to the grammar of some semantic interpretations based on the analysis of the occurrence of these components in the select set of other semantic interpretations. Both modifications can be carried out either automatically or offered for validation. Some benefits of the presented method and system are: reduced effort for building grammars, improvement of recognition accuracy, automatic adaptation of dynamic grammars to the context.

6 Claims, 11 Drawing Sheets

| | Concept C | Grammar annotation | is-more-specific-than |
|---|---|---|---|
| 51 | FOO | foo bla | --- |
| 52 | ABC | foo [bar\|def] abc | FOO |
| 53 | XYZ | foo xyx | FOO |
| 54 | BETA | beta bla | --- |
| 55 | ALPHA | alpha bla | BETA |

56 { Spec(FOO) = {ABC, XYZ}
     Spec(BETA) = {ALPHA}

Fig. 9

METHOD AND SYSTEM FOR GRAMMAR RELAXATION

CROSS REFERENCE TO RELATED APPLICATIONS

This application claims priority to U.S. Provisional Patent Application No. 61/054,975 filed May 21, 2008, which is hereby incorporated by reference in its entirety.

FIELD OF THE INVENTION

The present invention applies to grammar generation for automated speech recognition systems.

STATEMENT REGARDING FEDERALLY SPONSORED RESEARCH OR DEVELOPMENT

Not Applicable.

BACKGROUND OF THE INVENTION

Automatic Speech Recognition (ASR) systems take a spoken utterance as input and return a recognized word sequence, and may be a recognized semantic interpretation, as result. The set of word sequences that can be recognized by an ASR and corresponding semantic interpretations are typically specified using a grammar that can be a context-free grammar, a statistical grammar or a combination of both.

In the following we will talk about context-free grammars that might use as some components references to external grammars of any type acceptable to the ASR.

There are a variety of formalisms used to specify context free grammars. Various ASR platforms may use: GSL (Grammar Specification Language), GRXML (Grammar XML), ABNF (Augmented Backus—Naur Form). Entering grammars directly in one of these formats requires special expertise and is a time consuming and error prone process. Therefore, many tools for building speech applications provide means to specify grammars in other, much more convenient formats, which are then transformed into the final format understood by an ASR platform. Some tools may simply fully enumerate sets of all allowed phrases. Others may use GUI methods to specify data for grammar generation, e.g. using a table or spreadsheet (U.S. Pat. No. 5,995,918). Still others, may use elements of GSL— or ABNF-like syntax, and allow for creation of grammar annotations on individual semantic concepts, which then may be combined to create final grammars. Finally, some systems avoid entering any portion of the grammar manually and, instead, generate grammars automatically from names of concepts to be recognized (US Patent Application 2006/0259294).

Practically all commercial ASR platforms support also some form of probabilistic annotations of the context-free grammars, e.g. to specify the probability with which a sub-rule or an item may occur, or to specify likelihood of skipping a particular sub-rule or item. Some of those annotations are really weights used to quantitatively differentiate the importance of particular sub-rules.

Even if grammars do not have to be entered directly using GSL, GRXML, or ABNF, defining a grammar sometimes still remains problematic. Two important factors that contribute to this are: (1) a multitude of the utterances and their variations that may be uttered by a user while referring to a single semantic interpretation; (2) difficulty of direct reuse of grammars or portions thereof in various contexts (grammars may have to be context specific).

Regarding the first factor (1), some reasons for the multitude of utterance variations are: (a) numerous word and phrase synonyms that may be applicable; (b) different grammatical variations of the same sentence or phrase; (c) omissions of words and phrases that are implied and/or superfluous given known dialog context (this is one of the causes of the difficulty mentioned in point (2)).

Point (1c) can be illustrated on an example of a photo camera product recognition task. Suppose that individual grammar rules identify product models from a large manufacturer. As an example, a full name of a fictitious digital camera could be: ION Digital Ninja Zi DSLR. Very few users would utter this name in its entirety. A typical user behavior would be to skip some of the words/sub-phrases; moreover, a user would be much more likely to skip words/phrases that are shared in many product names (thus user might not consider them distinguishing and worth mentioning), and much less likely to skip unique ones (ones that user perceives as distinguishing the product). Therefore, to reflect this user behavior, the grammar for this product (semantic interpretation) has to allow for certain words to be optional, accepting e.g. ION Ninja Zi, or, Ninja Zi DSLR. A trivial solution of making all components optional would generally not work well as this might result in higher recognition error rate—because the grammar would accept too many unrealistic utterances with the same weight as realistic ones regardless of the context.

Regarding the second factor (2), the difficulty of reuse, it can be illustrated on the same general example. Let's assume that a grammar was manually entered that corresponds to the semantic interpretation ION Digital Ninja Zi DSLR. This grammar may have been tuned to a specific type of question with a specific set of possible products (semantic interpretations) answering the question. Reusing that grammar in a different context (for a different question) where a set of possible answers (products or semantic interpretations) is different may result in undesired behavior such as non-optimal recognition error rate An example would be if the original grammar was tuned to the full set of products, and we are trying to reuse a portion of it in a question about only a small subset of products including just ION Digital Ninja Zi DSLR, ION Digital Ninja Fixa DSLR and ION Digital Ninja Beta DSLR. In this new context, users are more likely to utter single words like "Zi", "Fixa" or short phrases including them because they are meaningful given the context; therefore, the grammar would have to be modified to accept these words. However, in the larger context, it may be extremely unlikely that users would utter such short product descriptions; therefore, having them in the grammar may deteriorate the accuracy of recognition. Typically, to avoid this problem one would have to maintain different grammars depending on the context in which they are used, which again increases the amount of work and increases chance for error, especially if system has to be modified in the future.

There is a special aspect to example from point (1c) that applies if there are relationships between the semantic concepts, in particular, if some concepts are (perceived as) more generic while the others are more specific. For example, suppose ION Digital Ninja Zi DSLR product model was a member of a Digital Ninja product family that included numerous product models. Suppose also that answering the most general product model question a user tries to say a name of one of the products in the Digital Ninja family but omits one of the required product name components. In such a case, rather than to misrecognize or reject the utterance completely, a preferable behavior would be to recognize at least a more generic (product family) concept and then ask a follow up question to get to the more specific concept (product model). Which means that the grammar for the generic concept (product family) has to be defined so as to capture utterances that vaguely identify (some of) the specific concepts in addition to capturing utterances identifying this generic concept directly.

BRIEF SUMMARY OF THE INVENTION

The current invention describes a method and system that address points (1c) and (2) described in the Background of the Invention. In distinction from prior-art (e.g., U.S. Pat. No. 7,257,529), it does not expand grammars by adding synonyms from external dictionaries, or by modifying the sentence or phrase structure to create equivalent sentence or phrase forms, or by using similar transformational methods. These prior-art methods address points (1a) and (1b).

The current invention relies on the information contained in the grammar, plus generic/specific relations between concepts if applicable and specified. The method and system modify the context-free grammar (or an annotation that is used to generate the grammar) by making select words and phrases optional or, more generally, by changing (which typically will be increasing) their likelihood of being skipped. If semantic concepts are so annotated as to identify generic and specific concepts, the method and system may augment grammars of the generic concepts with select components of the relevant specific concept grammars. As result, the final grammar will accept some utterances that the original grammar could not, hence the name for this procedure—grammar relaxation. This grammar relaxation method is neither simply uniform nor random but relies on the analysis of the input grammar, so as not to create just any over-generating grammar that would be prone to erroneous recognitions.

The major benefits of the method and system are: (1) fewer grammar rules (in whatever format) have to be entered manually for each semantic interpretation, (2) the modified grammar will improve recognition accuracy and (3) the entered grammar rules will be adapted automatically by the method and system of this invention to the context within which they are used.

BRIEF DESCRIPTION OF THE DRAWINGS

The accompanying drawings, wherein like referenced numerals are employed to designate like parts or steps, are included to provide further understanding of the invention and are incorporated in and constitute a part of this specification, illustrate embodiments of the invention and, together with the description, serve to explain the principles of the invention.

In the drawings:

FIG. 9 shows an example of a set of semantic concepts with is-more-specific-than relationship.

DETAILED DESCRIPTION OF THE PREFERRED EMBODIMENTS

Figure 1:
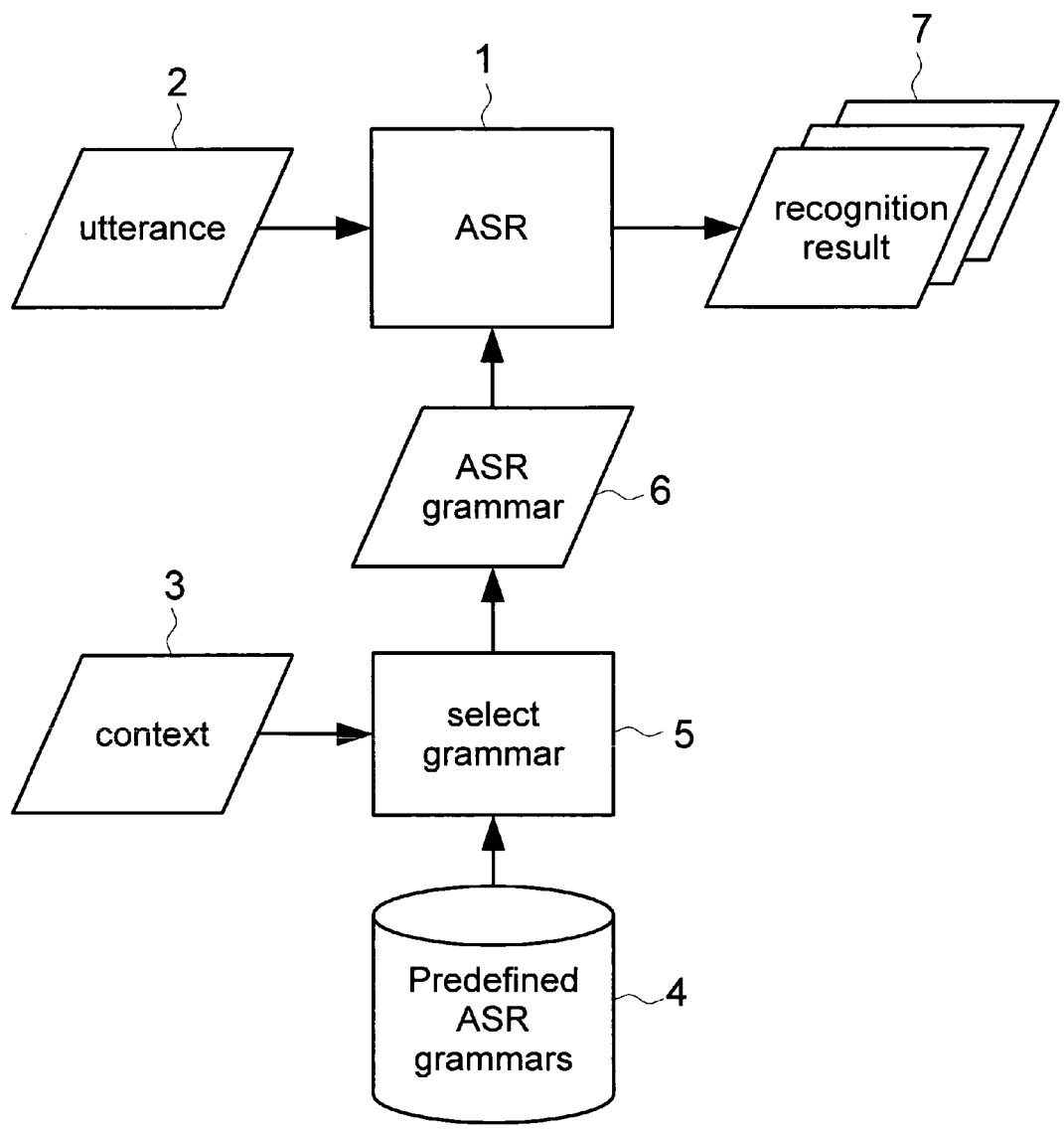
FIG. 1 ASR system assigns one or more recognition results to a speaker utterance using one of the provided grammars.

FIG. 1 shows a base ASR system 1 that uses context-free grammars 6 to assign recognition result or results 7 to a speaker utterance 2. The ASR system 1 may be any of the commercially or otherwise available ASR systems capable of using context-free grammars 6. The format of the representation of context free grammar 6 is not of importance, and may be GSL, GRXML, ABNF, or some other format. Given a particular context of an interaction 3, which, for example, may correspond to a position in a dialog flow or/and to the information collected from a user by the moment, an appropriate grammar 6 is selected 5 from the set of predefined grammars 4. ASR system 1 takes spoken user utterance 2 as input and assigns one or more recognition results 7 to that utterance if it matched any of the grammar rules in grammar 6. The recognition result 7 will generally contain a sequence of recognized words. It may also contain a corresponding semantic interpretation. In a typical ASR system the semantic interpretations will correspond to tags associated with grammar rules. The recognition results 7 may be returned in form of N-Best results and may have recognition confidence assigned to each of them. Further processing of the recognition results may include confirmation or disambiguation, and assigning of a semantic interpretation if that had not already been done by ASR 1, but this is not the subject of this patent.

Figure 2:
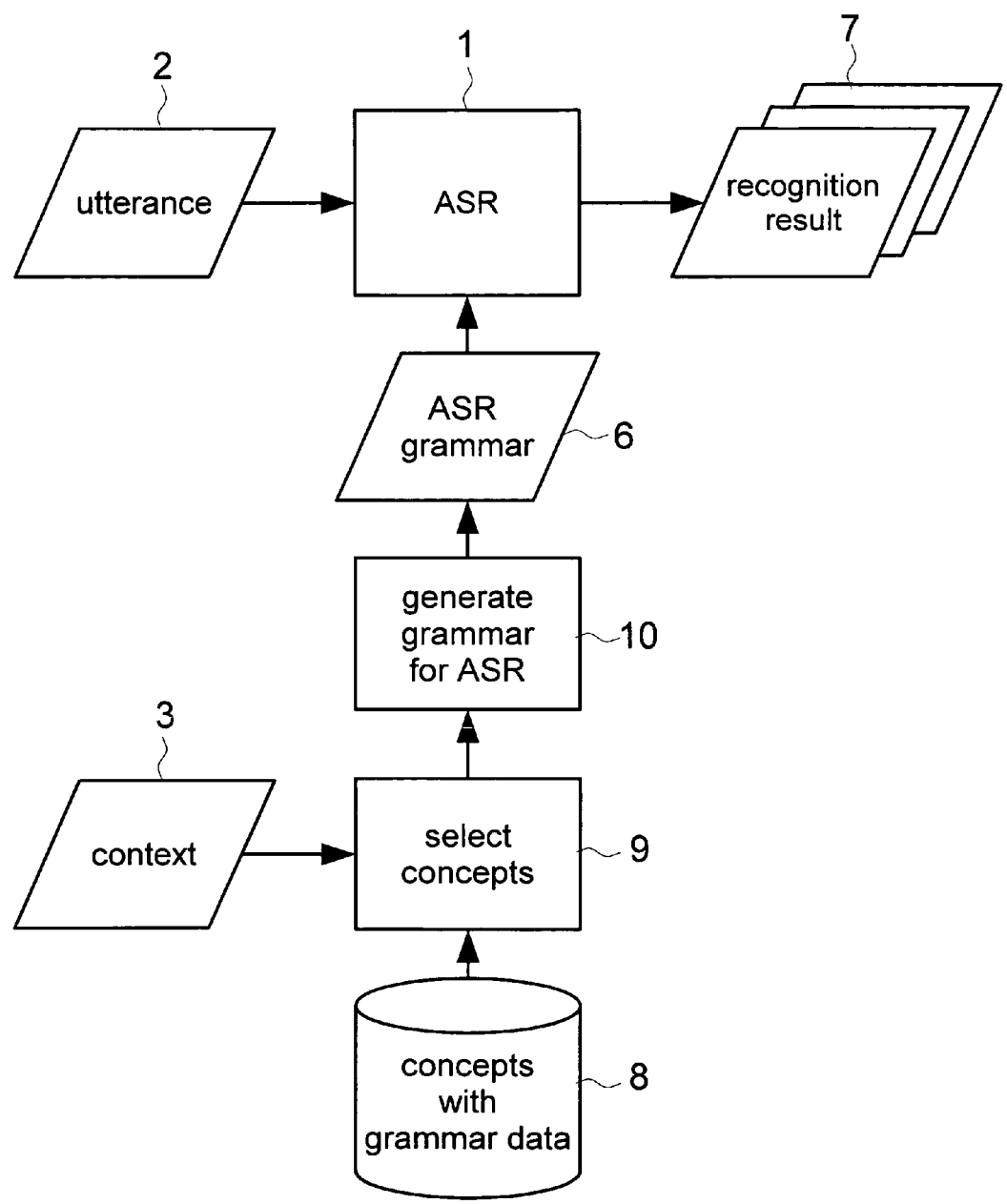
FIG. 2 ASR does the same work as in FIG. 1, but this time it uses grammar that was generated from the set of annotated semantic concepts that were selected based on the context of a question.

FIG. 2 shows an alternative setup of a system for Automatic Speech Recognition. The difference to FIG. 1 lies in that rather than storing complete predefined grammars 4, now individual grammar rules (or data that can be used to generate grammar rules) are associated with each semantic concept. For example, each semantic concept could be associated with one or more ABNF grammar rules that specify which utterances are accepted. Given interaction context 3 now, rather than selecting predefined grammar, as in 5, a set of relevant concepts is selected 9 from the concept-grammar store 8. Grammar data, like the said ABNF rules, associated with these individual concepts is then used to generate 10 final ASR grammar 6 that will be used by ASR 1 to assign recognition result 7 to utterance 2.

Figure 3:
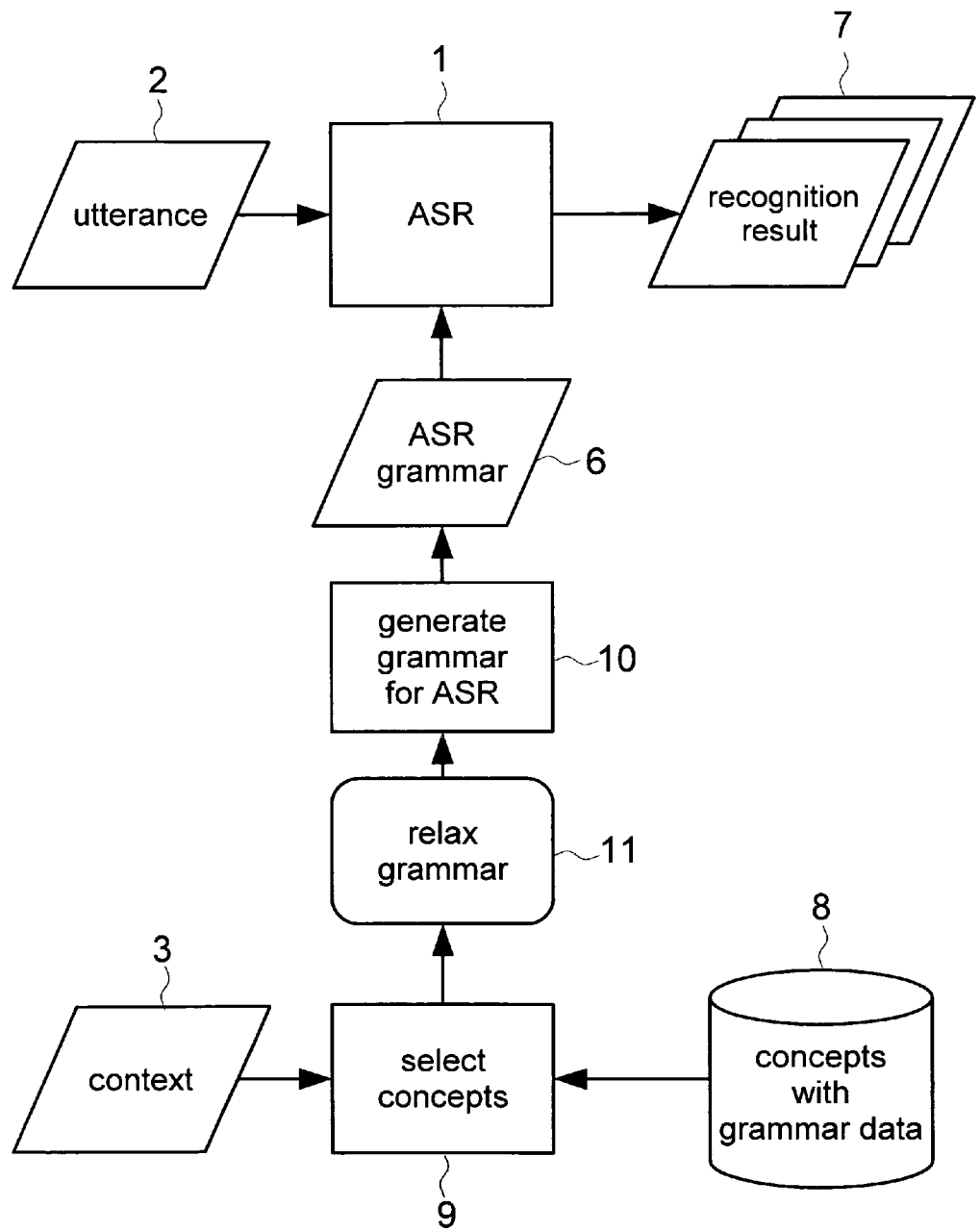
FIG. 3 is similar to FIG. 2, but includes grammar relaxation before final ASR grammar gets generated.

FIG. 3 shows where the grammar relaxation step 11 could fit into a setup from FIG. 2. Grammar relaxation is here applied to components of grammar data retrieved in step 9. Once the relaxation is complete, the same step 10 as in FIG. 2 can be applied to generate final ASR grammar 6. Because of the presence of grammar relaxation 11, grammar data stored in 8 may be more constrained (easier to enter). Also grammar relaxation is performed in the specific context 3, which means that grammar data stored in 8 gets adapted to specific context before it is used, which again makes it easier to enter (or maintain). In cases with a large number of dynamically generated contexts the use of grammar relaxation may be the only way to get context-dependent grammars.

Figure 4:
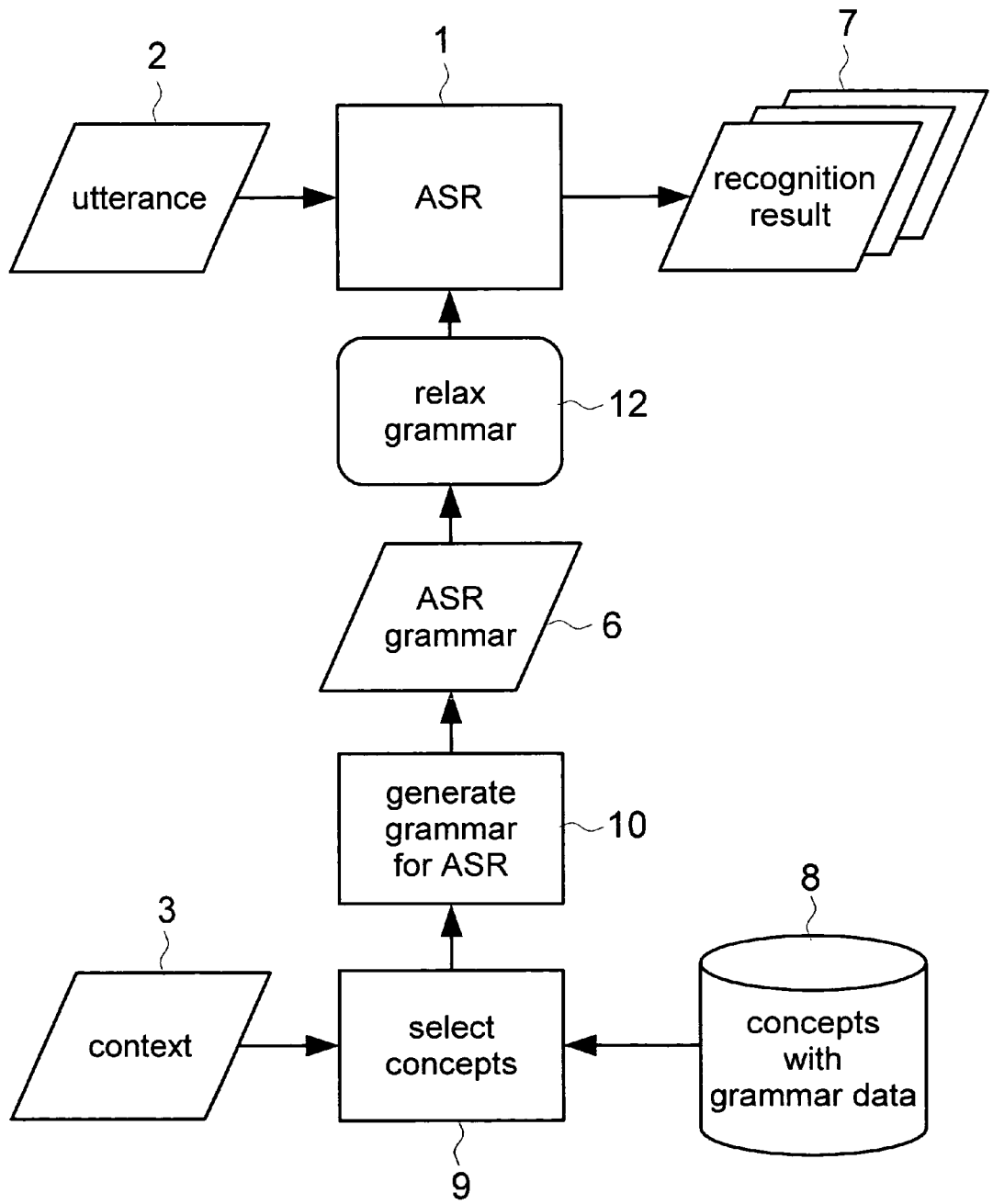
FIG. 4 shows a setup alternative to FIG. 3 where grammar relaxation is performed directly on ASR grammar.
Figure 5:
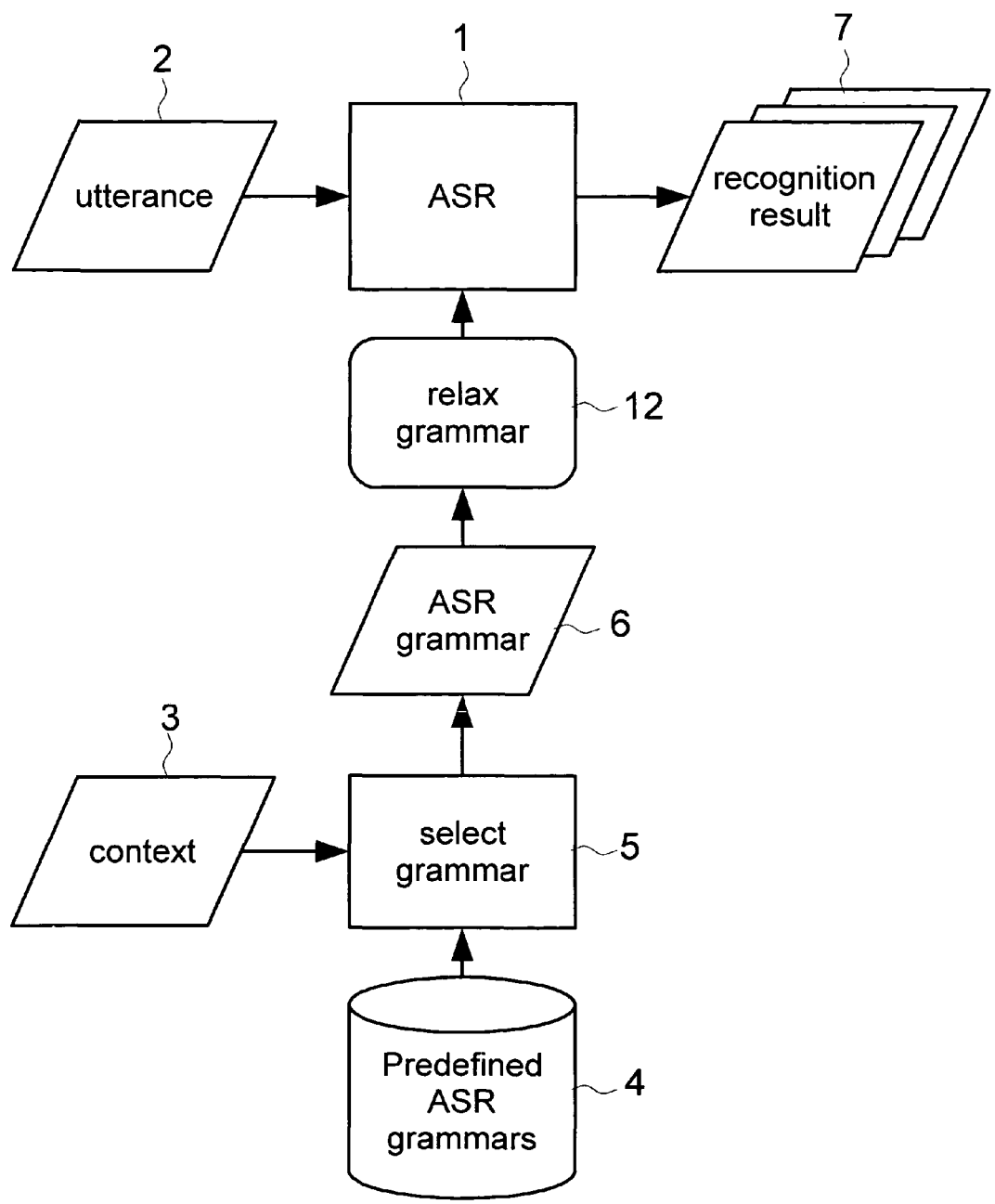
FIG. 5 shows that grammar relaxation can also be applied in the original setup from FIG. 1.

FIG. 4 shows an alternative to FIG. 3 where grammar relaxation step 12 is applied to the ASR grammar 6, as opposed to being applied to the grammar data as in step 11 FIG. 3. This approach will probably be more complex than approach from FIG. 3. (Also, if the grammar 6 does not have semantic annotations anymore the step of grammar relaxation 12 may be limited in utility.) However, this approach has the benefit of being more generic and it can be applied more easily in other speech recognition setups, like e.g. in setup illustrated in FIG. 5 which is a modification of setup from FIG. 1.

Figure 6:
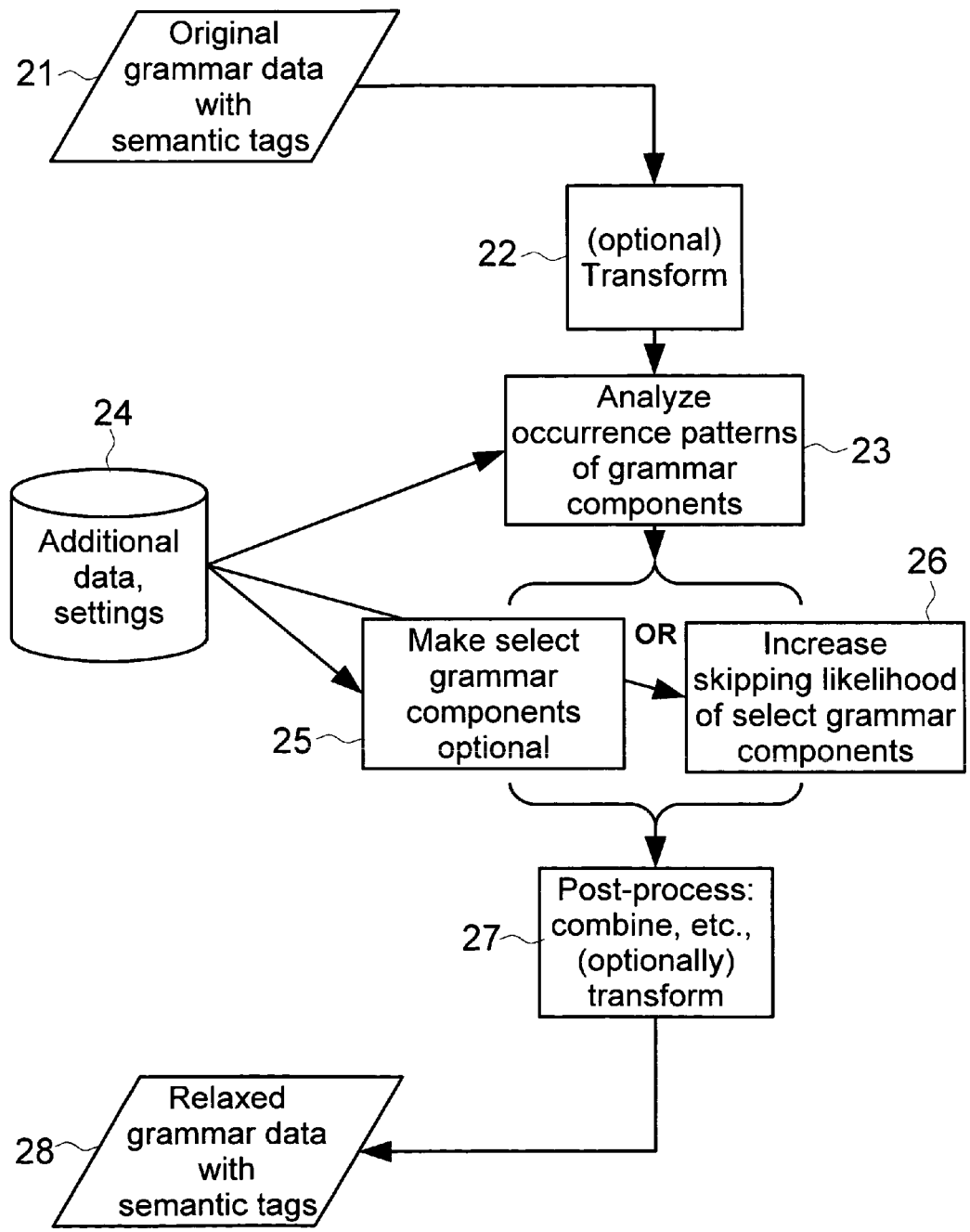
FIG. 6 illustrates a general setup of the grammar relaxation method.

FIG. 6 illustrates the idea of a typical manifestation of grammar relaxation. The starting point is grammar data with associate semantic tags (or semantic concepts with associated grammar data) 21. The grammar data might be in form of ABNF rules, as mentioned in description of FIG. 2. Or it might be an enumeration of all acceptable utterances, or represented in some other way. Generally, the grammar relaxation method of this invention may work with any format of grammar data representation, either directly, or after transformation 22. In certain manifestations, this transformation might involve parsing an ASR grammar as in FIGS. 4 & 5. The next step of grammar relaxation is a process that analyzes occurrence patterns of grammar components 23. The components could be individual words, phrases, grammar items or sub-rules. Analysis may, for example, include calculating occurrence statistics of various grammar components across different semantic tags. The analysis process 23 may be instructed to treat different components, e.g. different words, differently as specified in configuration data 24. After analysis, the grammar data gets modified. Depending on a particular grammar relaxation implementation and on the capabilities of the final ASR grammar either step 25 or 26 may be performed. Step 25 would typically be used if the ASR grammar does not have a mechanism to specify likelihood of skipping for grammar components. In such a case the individual components can be relaxed only by making them optional. If likelihood of skipping for grammar components is supported, then either step 25 can be executed or the more advanced step 26 in which grammar relaxation can assign values reflecting the likelihood of skipping of grammar components. Finally, step 27 may be applied to combine and/or compress the grammar data and if needed to transform it back into the same format as the data was in 21. The final output is a relaxed grammar 28.

Figure 7:
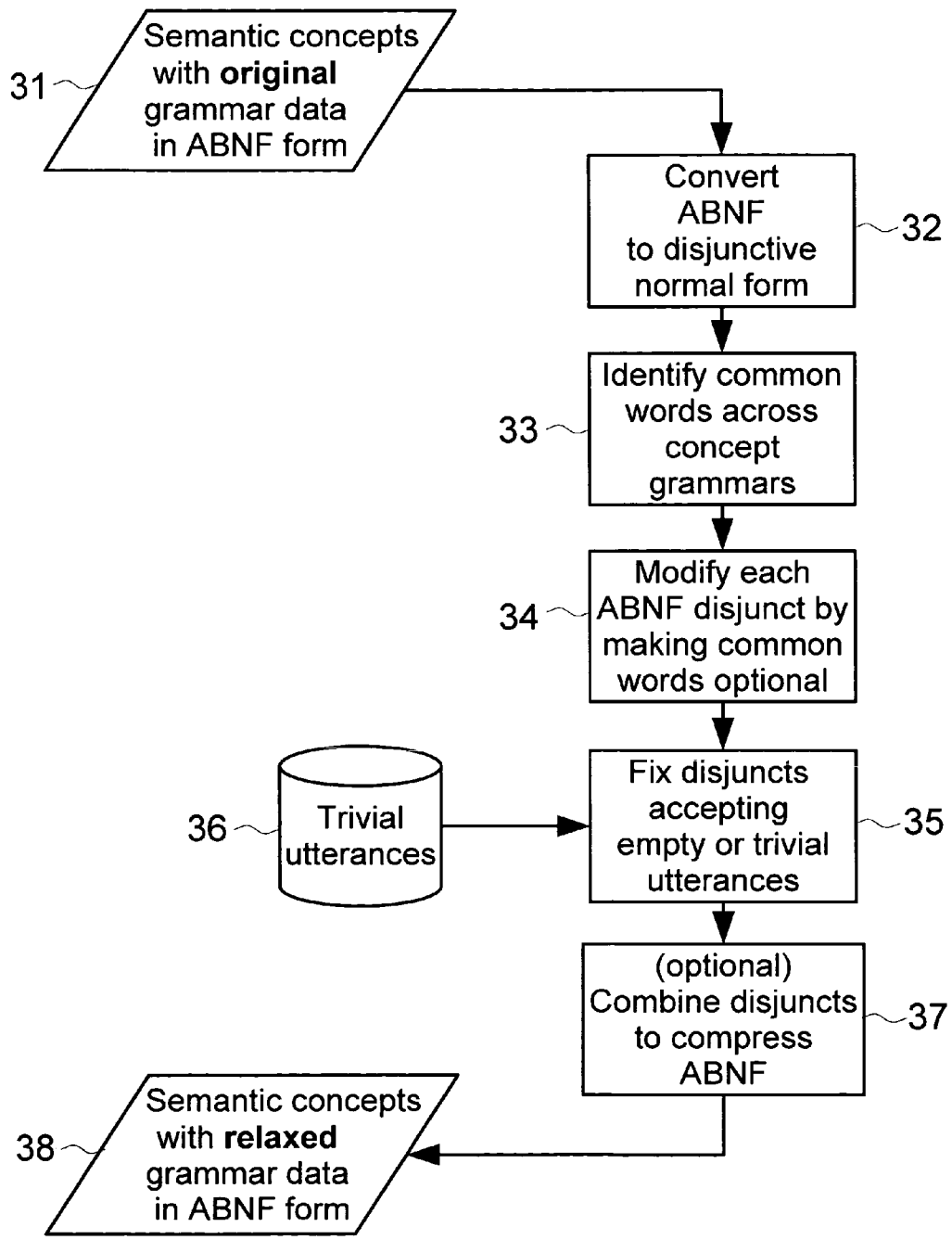
FIG. 7 shows steps of a simple manifestation of the grammar relaxation method.

FIG. 7 shows steps of a simple exemplary manifestation of the grammar relaxation method. The original grammar data is stored as ABNF rules associated with semantic concepts 31. For example, assume that there are two concepts ABC and XYZ. The grammar data could be stored as: ABC=>foo [bar\def] abc; XYZ=>foo xyz. The first step 32 is to convert the ABNF rules to their generalized normal disjunctive normal form where all alternative operations represented by bar sign '|' are expanded. In current example the output of this step would be: ABC=>(foo [bar] abc|foo [def] abc); XYZ=>foo xyz. Next step 33 identifies words common across all concepts. In the current example that would be only one word: foo. Step 34 modifies each ABNF disjunct by making the words previously identified as common optional. In the current example the output of this step would be: ABC=>([foo][bar] abc|[foo][def] abc); XYZ=>[foo] xyz. In general case, modifications performed in step 34 may result in grammar disjuncts that accept empty utterances or trivial utterances (e.g., words like "the"). Therefore, step 35 is needed to fix such disjuncts, e.g., by making a single select word in a disjunct non-optional—the word to be made non-optional could be selected e.g. based on its occurrence frequency. In this exemplary manifestation step 35 identifies trivial utterances by matching them against a predefined set 36. In the ABC, XYZ example step 35 did not have to be performed. Finally, step 37 combines disjuncts to create more compact ABNF rules. In current example the output of this step would be: ABC=>[foo][bar\def] abc; XYZ=>[foo] xyz. This would also be the final result 38. Note that in the ABC, XYZ example, the original grammar would not accept utterance "abc" while the relaxed grammar will accept it and assign ABC as semantic interpretation.

Figure 8:
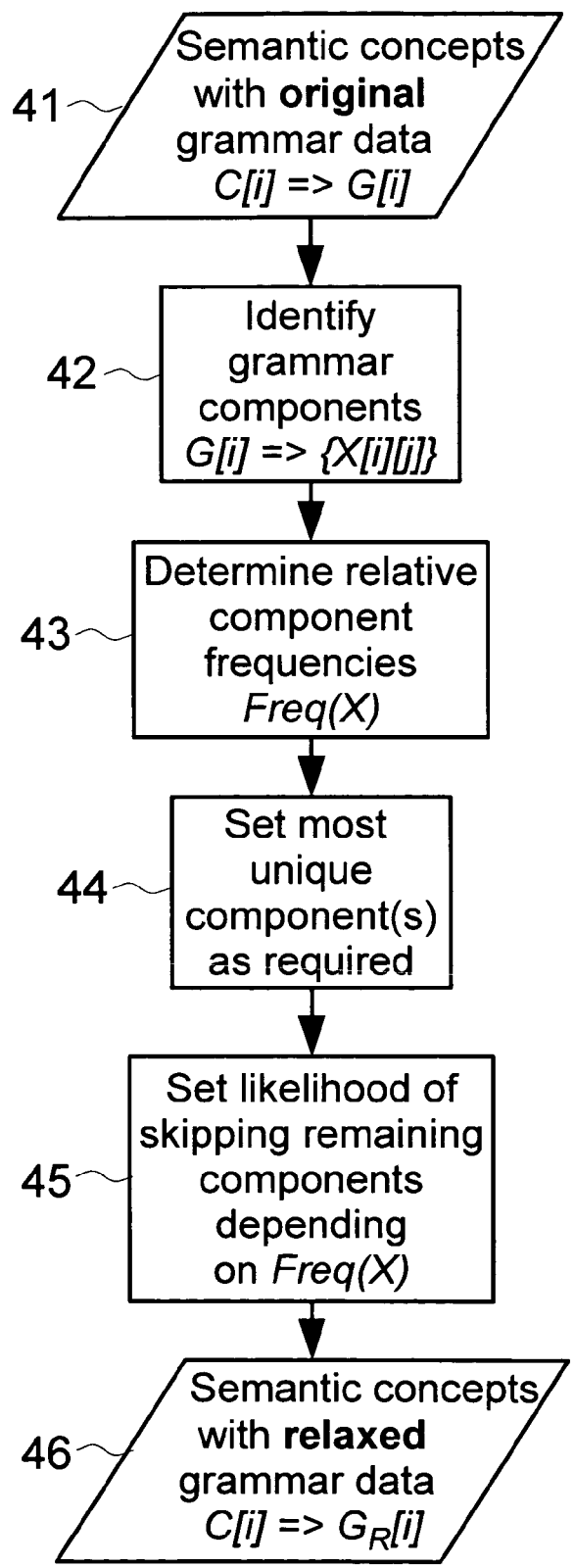
FIG. 8 shows steps of a more complex manifestation of the grammar relaxation method which sets/modifies the likelihood of skipping of grammar components.

FIG. 8 represents an alternative manifestation of the grammar relaxation. It is applicable in situations when an ASR system and grammar allow for specifying likelihood of skipping for individual grammar components. The input 41 consists of semantic concepts C[i] with associated grammar data G[i]. First step 42 consists of identifying for each G[i] its constituent grammar components {X[i][j]}. In next step 43, relative grammar components frequencies Freq(X) are determined across all C[i]. Freq[X] may be, for instance, defined as the number of semantic concepts C[i] containing grammar component X. Then, in step 44, for every concept C[i] the most unique components that belong to its original grammar are determined. These are the components with minimum values of Freq(X), i.e., in some implementations may mean that they belong to the minimum number of other concept grammars. Usually, every grammar contains one or more completely unique elements that do not belong to any other concept. These components are set as required in the final grammar (likelihood of skipping is set to 0.0). All the other elements are made optional, in step 45, with the likelihood of skipping depending on Freq(X) and total number of competing concepts, typically increasing with the value of Freq(X). This gives final relaxed grammar $G_R[i]$ (46). In a slightly different approach, instead of just making a grammar component optional we can make it additionally complemented with a garbage-accepting alternative.

The steps of the above described manifestation of FIG. 8, can have a variety of implementations, ranging from simple to increasingly complex. For example, step 42 in a simple implementation may identify components {X[i][j]} without any contextual information, e.g. a word may be treated uniformly irrespective of the context within which it occurs. A more sophisticated implementation of 42 would identify also where a grammar component X[i][j] occurs within the grammar structure and then use that structural information in the following steps 43, 44, and 45. Thus we could, for instance, differentiate grammar components that are textually the same, but which describe the beginning of a user utterance vs. the ones describing the end of a user utterance.

Example manifestations presented in FIGS. 7 & 8 assumed presence of semantic concepts either in the data used to generate the ASR grammar or in the ASR grammar itself (as semantic tags). However, modifications of the described algorithms are possible to create manifestations that do not need semantic concepts/annotations. A trivial example of how this could be achieved can be shown based on the method presented in FIG. 7. In step 33, rather than identifying words common across all concepts, the method could identify words common across all disjuncts. The remainder of the steps would be the same as in the original method of FIG. 7. More generally speaking, we can apply the relaxation methods in FIGS. 7 & 8 to grammars without semantic tags after we assign to every disjunct a unique artificial tag, for instance a number of the disjunct in any selected type of ordering.

In certain applications, there may be relationships between semantic interpretation concepts associated with the grammar. One type of relationship that can be used for grammar relaxation is-more-specific-then relationship (or the inverse is-more-generic-then). Some of the concepts may be more generic (e.g. product families), while others are more specific (e.g. product models). An example is illustrated in FIG. 9. Table 50 shows records 51, 52, 53, 54, 55 for different semantic concepts. As in the examples described above, each concept has a grammar annotation associated with it. Additionally, each concept may specify a concept compared to which it is more specific. So for example concepts ABC 52 and XYZ 53 are more specific than concept FOO 51 (FOO 51 is more generic than ABC 52 and XYZ 53). Similar type of relationship is between ALPHA 55 and BETA 54: ALPHA 55 is more specific than BETA 54 (BETA 54 is more generic than ALPHA 55). The is-more-specific-than relationship is transitive. In further figures and text, notation Spec(C) 56 is used to identify all concepts more specific than C (the transitive closure of is-more-specific-than relationship).

Figure 10:
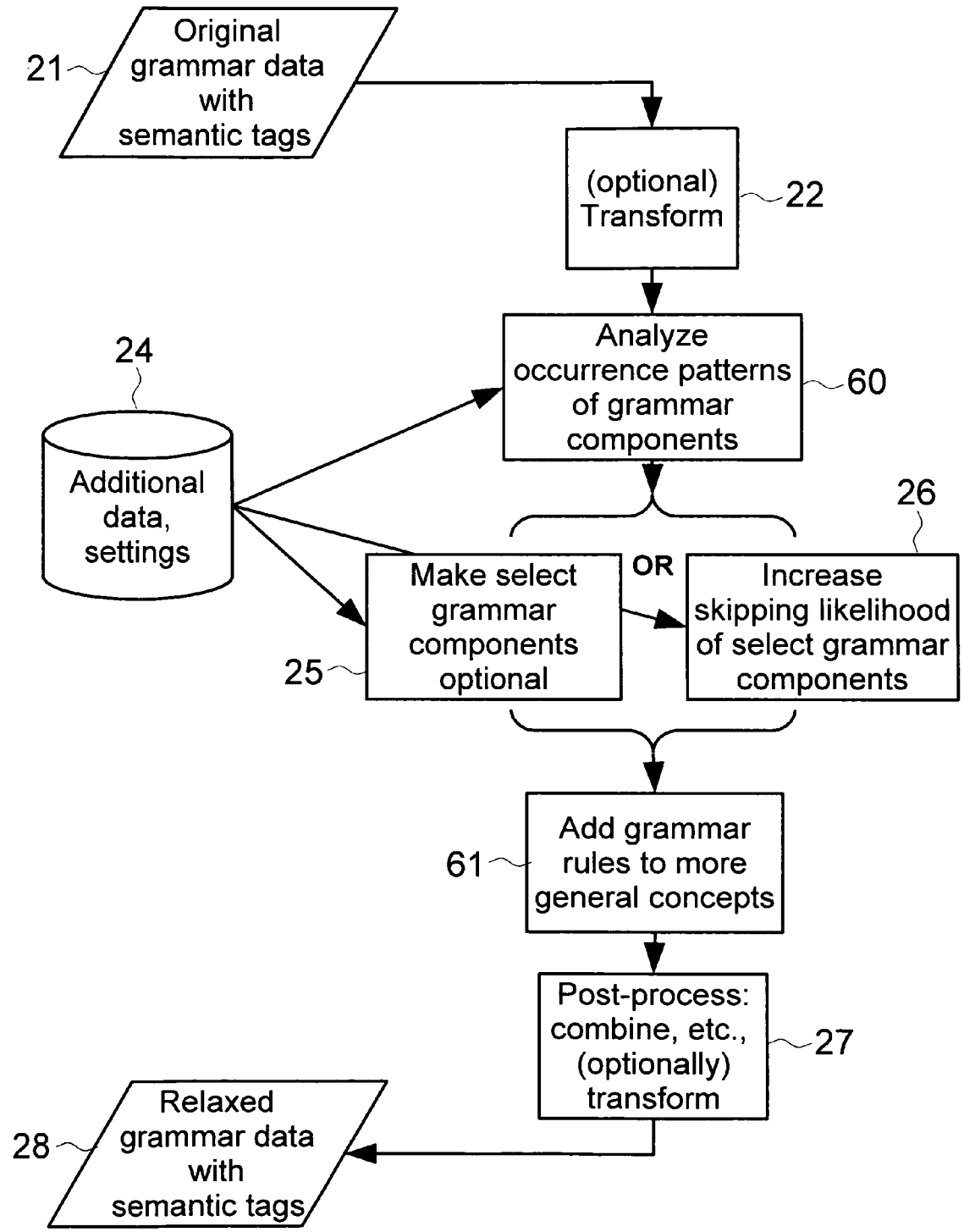
FIG. 10 shows setup from FIG. 6 extended with a relaxation step applicable if semantic concepts are annotated with is-more-specific-than relationship.

Presence of a relationship of that type between concepts opens additional possibilities for grammar relaxation. FIG. 10 shows this as compared to the original outline of the grammar relaxation algorithm for flat sets of concepts from FIG. 6. After steps 25 and 26 that make select grammar components optional or more likely to be skipped, step 61 is inserted which adds extra grammar rules to the semantic concepts C for which Spec(C)≠Ø. Step 23 from FIG. 6 is expanded and becomes step 60 in FIG. 10. Step 60 includes here an analysis of the occurrence patterns for subsets of more specific concepts in addition to analyzing patterns of the whole set of concepts.

Figure 11:
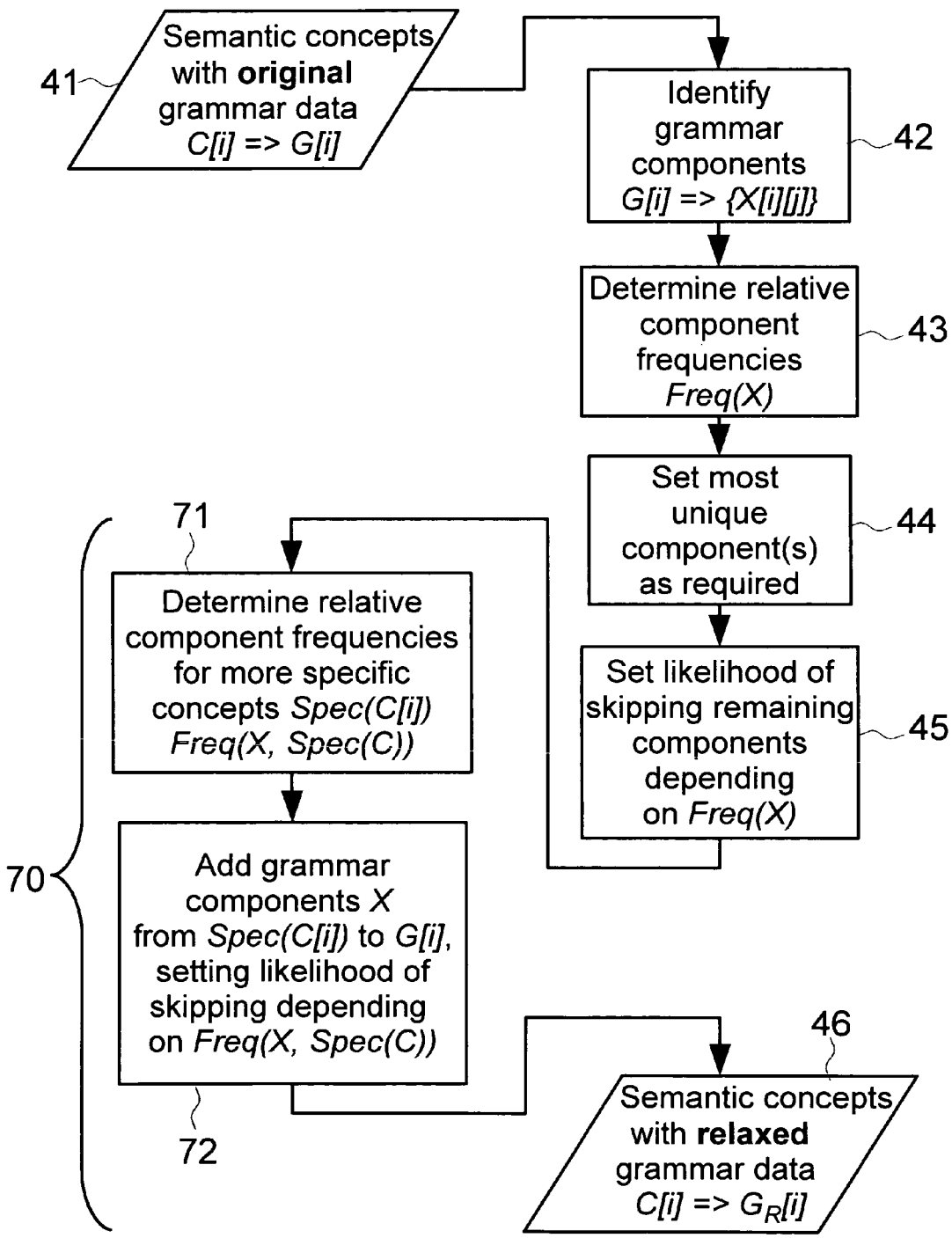
FIG. 11 shows relaxation method from FIG. 8 extended with a step adding grammar components to more generic semantic concepts.

FIG. 11 shows an example how an algorithm for achieving steps 60 and 61 from FIG. 10 can be added to the relaxation process already illustrated in FIG. 8 (it again assumes that grammar components can be annotated with the likelihood of skipping). The set of new steps identified as 70 are performed only for concepts C[i] for which Spec(C[i])≠Ø. For each such concept, first the frequency of a particular element X=X[i][j] within the set of more specific concepts Freq(X, Spec(C)) is determined 71. Every non-unique element X from the set of more specific concepts is then added 72 to the grammar of the more generic concept. Every added element X is made optional with the likelihood of skipping depending on Freq (X, Spec(C)) and the total number of more specific concepts, typically decreasing with the value of Freq(X, Spec(C)). Alternatively, instead of adding non-unique elements to the parent concept grammar, the latter is enriched with the versions of more specific concept grammars that are created by the replacement of most-unique grammar components with alternatives between those most-unique grammar components and garbage-accepting rules.

This type of concept grammar relaxation performs best if ASR supports likelihood of skipping. If likelihood of skipping cannot be specified, the algorithm could still be applied, though with less flexibility and benefit. For example, if applied to set of concepts and grammar from FIG. 9, it could relax grammar of concept FOO from (foo bla) to (foo bla|foo).

In one example manifestation, step 72 also includes suffixing the modified specific concept grammar elements X with a garbage grammar, with high probability of skipping, capable of capturing an arbitrary word or a (short) phrase. Although a grammar phrase including the garbage element will have low weight in the grammar, this way the modified more generic concept grammar will be still able to capture speaker utterances that might refer to some concept within the generic category. Going back to the earlier example, suppose that speaker says "ION Digital Ninja Gi or something like that". This utterance might be recognized as more generic ion_digital_ninja_dslr concept of the ion_digital_ninja_zi_dslr concept if the grammar of the more generic concept got relaxed with the grammar of a more specific concept suffixed with a garbage grammar element. It is obvious that the step of suffixing with a garbage element can be modified to also (or alternatively) include prefixing with a garbage element. In the example manifestation, any recognition based on the match of such a relaxed grammar rule including garbage element gets confirmed.

It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. In a system comprising an ASR component, the said ASR component using grammars to recognize speech in one or more interaction contexts, the said grammars comprising rules corresponding to semantic interpretations, the said rules comprising grammar components,
   a computer-implemented method for relaxing the said grammars, the said method comprising the steps of:
   retrieving the original grammar for the applicable interaction context from a computer-readable media;
   analyzing, by a computing device, the frequencies of occurrence of the grammar components within the original grammar, the step of analyzing, by a computing device, taking into account the semantic interpretations, and the result of the analysis comprising measures of uniqueness of the grammar components across all said semantic interpretations;
   modifying the original grammar, so that the modified grammar accepts word sequences that could not be accepted by the original grammar; wherein the said step of modifying the original grammar comprises at least one of:
      making selected components of the original grammar optional, the selection of the said components being based on the results of the said analysis step;
      changing a likelihood of skipping for the grammar components of the said original grammar, the amount of change for each said grammar component being based on the results of the said analysis step;
   outputting the modified grammar via computer-writable media for use by the ASR component.

2. In a system comprising an ASR component, the said ASR component using grammars to recognize speech in one or more interaction contexts, the said grammars comprising rules corresponding to semantic interpretations, the said rules comprising grammar components, and the said semantic interpretations organized into a semantic interpretation hierarchy,
   a computer-implemented method for modifying the said grammars, the said method comprising the steps of:
   retrieving the original grammar for the applicable interaction context from a computer-readable media;
   analyzing the original speech recognition grammar, wherein the said step of analyzing the said original grammar comprises:
      for all said semantic interpretations, analyzing the frequencies of occurrence of the grammar components within the said original grammar, the step taking into account the semantic interpretations; and for each said semantic interpretation in the said hierarchy, analyzing the frequencies of occurrence of the grammar components for all descendants of the said semantic interpretation in the said hierarchy within the original grammar;

modifying the original grammar, so that the modified grammar accepts word sequences that could not be accepted by the original grammar; wherein the said step of modifying the original grammar comprises at least one of:

selecting some of the said grammar components of the said original grammar and making them optional, the selection of the said components being based on the results of the said analysis step, and selecting grammar components corresponding to the said semantic interpretations in the said hierarchy and adding them to the grammar rules for their ancestors in the said hierarchy, the selection of the said components being based on the results of the said analysis step;

changing a likelihood of skipping for the said grammar components of the said original grammar, the amount of change being based on the results of the said analysis step, and taking grammar components corresponding to the said semantic interpretations in the said hierarchy and adding them to the grammar rules for their ancestors in the said hierarchy, while doing this, assigning to said grammar components a likelihood of skipping, the value of which being based on the results of the said analysis step;

outputting the modified grammar via computer-writable media for use by the ASR component.

3. The computer-implemented method of claim 2, wherein the step of modifying the said original grammar further comprises at least one of:

suffixing with garbage grammars these grammar components that have been added to the grammar rules of the ancestors in the said semantic interpretation hierarchy;

prefixing with garbage grammars these grammar components that have been added to the grammar rules of the ancestors in the said semantic interpretation hierarchy.

4. A computer-based system for relaxing grammars that are used in an ASR component for speech recognition in one or more interaction contexts, the said grammars comprising rules corresponding to semantic interpretations, the said rules comprising grammar components, the system comprising:

a processor; a memory;

a grammar retrieval component configured to retrieve the original grammar for the applicable interaction context from a computer-readable media;

an grammar analysis component configured to analyze the frequencies of occurrence of the grammar components within the original grammar, taking into account the semantic interpretations, outputting a result comprising measures of uniqueness of the grammar components across all said semantic interpretations;

a grammar modification component configured to modify the original grammar, so that the modified grammar accepts word sequences that could not be accepted by the original grammar; wherein modifying the original grammar comprises at least one of:

making selected components of the original grammar optional, the selection of the said components being based on the output of the analysis component;

changing a likelihood of skipping for the grammar components of the said original grammar, the amount of change for each grammar component being based on the output of the analysis component;

a grammar output component outputting the modified grammar via computer-writable media for use by the ASR component.

5. A computer-based system for relaxing grammars that are used in an ASR component for speech recognition in one or more interaction contexts, the said grammars comprising rules corresponding to semantic interpretations, the said rules comprising grammar components, and the said semantic interpretations organized into a semantic interpretation hierarchy, the system comprising:

a processor; a memory;

a grammar retrieval component configured to retrieve the original grammar for the applicable interaction context from a computer-readable media;

a flat grammar analysis component configured to analyze the the frequencies of occurrence of the grammar components within the said original grammar, taking into account the semantic interpretations;

a hierarchical grammar analysis component, configured to analyze for each said semantic interpretation in the semantic interpretation hierarchy within the original grammar the frequencies of occurrence of the grammar components for all descendants of the said semantic interpretation in the said hierarchy;

a grammar modification component configured to modify the original grammar, so that the modified grammar accepts word sequences that could not be accepted by the original grammar; wherein modifying the original grammar comprises at least one of:

making selected components of the original grammar optional, the selection of the said components being based on the output of the flat analysis component, and selecting grammar components corresponding to the said semantic interpretations in the said hierarchy and adding them to the grammar rules for their ancestors in the said hierarchy, the selection of the said components being based on the output of the hierarchical analysis component;

changing a likelihood of skipping for the grammar components of the said original grammar, the amount of change for each grammar component being based on the output of the flat analysis component, and taking grammar components corresponding to the said semantic interpretations in the said hierarchy and adding them to the grammar rules for their ancestors in the said hierarchy, while doing this, assigning to said grammar components a likelihood of skipping, the value of which being based on the output of the hierarchical analysis component;

a grammar output component outputting the modified grammar via computer-writable media for use by the ASR component.

6. A computer-based system of claim 5, wherein the grammar modification component is further configured to perform at least one of:

suffixing with garbage grammars these grammar components that have been added to the grammar rules of the ancestors in the said semantic interpretation hierarchy;

prefixing with garbage grammars these grammar components that have been added to the grammar rules of the ancestors in the said semantic interpretation hierarchy.

* * * * *